United States Patent
Locketz et al.

(10) Patent No.: US 11,664,989 B2
(45) Date of Patent: May 30, 2023

(54) COMMISSIONING AN ACCESS CONTROL DEVICE WITH A PROGRAMMABLE CARD

(71) Applicant: Schlage Lock Company LLC, Carmel, IN (US)

(72) Inventors: Drew Locketz, Lakewood, CO (US); Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 417 days.

(21) Appl. No.: 16/844,099

(22) Filed: Apr. 9, 2020

(65) Prior Publication Data

US 2021/0320793 A1 Oct. 14, 2021

(51) Int. Cl.
*H04L 9/08* (2006.01)
*H04L 9/32* (2006.01)
*G06K 7/10* (2006.01)

(52) U.S. Cl.
CPC ........ *H04L 9/0897* (2013.01); *G06K 7/10297* (2013.01); *H04L 9/3234* (2013.01)

(58) Field of Classification Search
None
See application file for complete search history.

(56) References Cited

U.S. PATENT DOCUMENTS

| | | | |
|---|---|---|---|
| 7,475,812 B1 | 1/2009 | Novozhenets et al. | |
| 9,054,961 B1* | 6/2015 | Kim | H04W 12/08 |
| 10,269,202 B2* | 4/2019 | Denison | G07F 9/001 |
| 10,735,201 B1* | 8/2020 | Straitiff | H04L 63/061 |
| 11,158,144 B2* | 10/2021 | Friedli | G07C 9/38 |
| 2011/0115602 A1* | 5/2011 | Bhandari | G07C 9/00309 340/5.6 |
| 2013/0212248 A1 | 8/2013 | Neafsey et al. | |
| 2014/0084059 A1 | 3/2014 | Sierchio et al. | |
| 2015/0039892 A1* | 2/2015 | Fujita | H04L 9/3226 713/171 |
| 2015/0148921 A1* | 5/2015 | Ito | H04W 4/80 700/66 |

(Continued)

FOREIGN PATENT DOCUMENTS

EP 2153573 B1 4/2018

OTHER PUBLICATIONS

International Search Report; International Searching Authority; International Patent Application No. PCT/US2021/026652; dated Sep. 27, 2021; 2 pages.

(Continued)

*Primary Examiner* — Arezoo Sherkat
(74) *Attorney, Agent, or Firm* — Taft Stettinius & Hollister LLP

(57) ABSTRACT

A method for commissioning an access control device according to one embodiment includes writing, by an enrollment reader, a site key and an access control device identifier to a credential device, reading, by the access control device, the site key and the access control device identifier from the credential device, writing, by the access control device, a device unique identifier (DUID) associated with the access control device and a modified access control device identifier to the credential device, and reading, by the enrollment reader, the DUID from the credential device.

20 Claims, 6 Drawing Sheets

(56) References Cited

U.S. PATENT DOCUMENTS

| | | | | |
|---|---|---|---|---|
| 2015/0222517 A1* | 8/2015 | McLaughlin | ........... | H04L 67/02 |
| | | | | 713/171 |
| 2015/0319006 A1* | 11/2015 | Plummer | ............ | H04L 12/2809 |
| | | | | 700/83 |
| 2016/0014131 A1* | 1/2016 | Neafsey | .............. | H04W 12/082 |
| | | | | 713/171 |
| 2016/0119284 A1* | 4/2016 | Kim | ........................ | H04L 67/12 |
| | | | | 726/12 |
| 2018/0124903 A1* | 5/2018 | Strods | ....................... | H04Q 9/00 |
| 2019/0289648 A1* | 9/2019 | Kim | ...................... | H04W 48/08 |
| 2019/0334890 A1* | 10/2019 | Baty | .................... | H04W 12/35 |
| 2019/0357339 A1* | 11/2019 | Kim | ....................... | H05B 47/11 |
| 2021/0327177 A1* | 10/2021 | Kirkjan | .............. | G07C 9/00309 |

OTHER PUBLICATIONS

Written Opinion; International Searching Authority; International Patent Application No. PCT/US2021/026652; dated Sep. 27, 2021; 6 pages.

\* cited by examiner

COMMISSIONING AN ACCESS CONTROL DEVICE WITH A PROGRAMMABLE CARD

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, credential systems generally require an interaction between the credential and a reader device (e.g., on or secured to the access control device) such that the reader device may read the credential and determine whether access should be granted. In particular, a user may be required to swipe, tap, or otherwise present the credential to the reader device.

Access control devices may be initially commissioned using a mobile application, which typically suffices provided that Wi-Fi, cellular, and/or similar communication is available to the mobile device in the vicinity of the particular access control devices being commissioned. However, in circumstances in which such infrastructure is missing or not set up, the common recourse is to remove the access control devices from the doors, take those devices to a remote location (e.g., a warehouse) with Internet access for commissioning, and return and reassemble the commissioned access control devices to the proper doors, which can be a laborious and time consuming process.

SUMMARY

One embodiment is directed to a unique system, components, and methods for commissioning an access control device. Other embodiments are directed to apparatuses, systems, devices, hardware, methods, and combinations thereof for commissioning an access control device.

According to an embodiment, a method for commissioning an access control device may include writing, by an enrollment reader, a site key and an access control device identifier to a credential device, reading, by the access control device, the site key and the access control device identifier from the credential device, writing, by the access control device, a device unique identifier (DUID) associated with the access control device and a modified access control device identifier to the credential device, and reading, by the enrollment reader, the DUID from the credential device.

In some embodiments, the method may further include transmitting, by the enrollment reader, the DUID to a management system.

In some embodiments, reading the DUID from the credential device may include reading a plurality of DUIDs from the credential device associated with corresponding access control devices, and the plurality of DUIDs may include the DUID associated with the access control device.

In some embodiments, writing the site key to the credential device may include writing an encrypted site key to the credential device.

In some embodiments, writing the site key and the access control device identifier to the credential device may include writing a site key active flag to the credential device.

In some embodiments, reading the site key and the access control device identifier from the credential device may include reading the site key and the access control device identifier from the credential device in response to determining that the site key active flag is set.

In some embodiments, reading the DUID from the credential device may include reading the DUID from the credential device in response to determining that the site key active flag is set.

In some embodiments, the method may further include incrementing the access control device identifier to generate the modified access control device identifier.

In some embodiments, the credential device may be a smartcard.

In some embodiments, the credential device may be or include one of a MIFARE EV1 credential or a MIFARE EV2 credential.

According to another embodiment, a system for device commissioning may include a credential reader configured to write a site key and a lock identifier to a smartcard and an electronic lock device configured to (i) read the site key and the lock identifier from the smartcard, (ii) increment the lock identifier to generate a modified lock identifier, and (iii) write a device unique identifier (DUID) of the electronic lock device and the modified lock identifier to the smartcard, and the credential reader may be further configured to read the DUID from the smartcard.

In some embodiments, the system may further include a management system configured to receive the DUID from the credential reader.

In some embodiments, to write the site key to the smartcard may include to write an encrypted site key to the smartcard.

In some embodiments, to write the site key and the lock identifier to the smartcard may include to write a site key active flag to the smartcard.

In some embodiments, to read the site key and the lock identifier from the smartcard may include to read the site key and the lock identifier from the smartcard in response to a determination that the site key active flag is set.

In some embodiments, to read the DUID from the smartcard may include to read the DUID from the smartcard in response to a determination that the site key active flag is set.

In some embodiments, the smartcard may be or include one of a MIFARE EV1 credential or a MIFARE EV2 credential.

According to yet another embodiment, an access control device for device commissioning may include at least one processor and at least one memory comprising a plurality of instructions stored thereon that, in response to execution by the at least one processor, causes the access control device to read a site key and an access control device identifier from a credential device, increment the access control device identifier to generate a modified access control device identifier, and write a device unique identifier (DUID) of the access control device and the modified access control device identifier to the credential device.

In some embodiments, to read the site key and the access control device identifier from the credential device may include to read the site key and the access control device identifier from the credential device in response to a determination that a site key active flag is set on the credential device.

In some embodiments, to read the site key and the access control device identifier from the credential device may include to read the site key and the access control device identifier from one of a MIFARE EV1 credential or a MIFARE EV2 credential.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
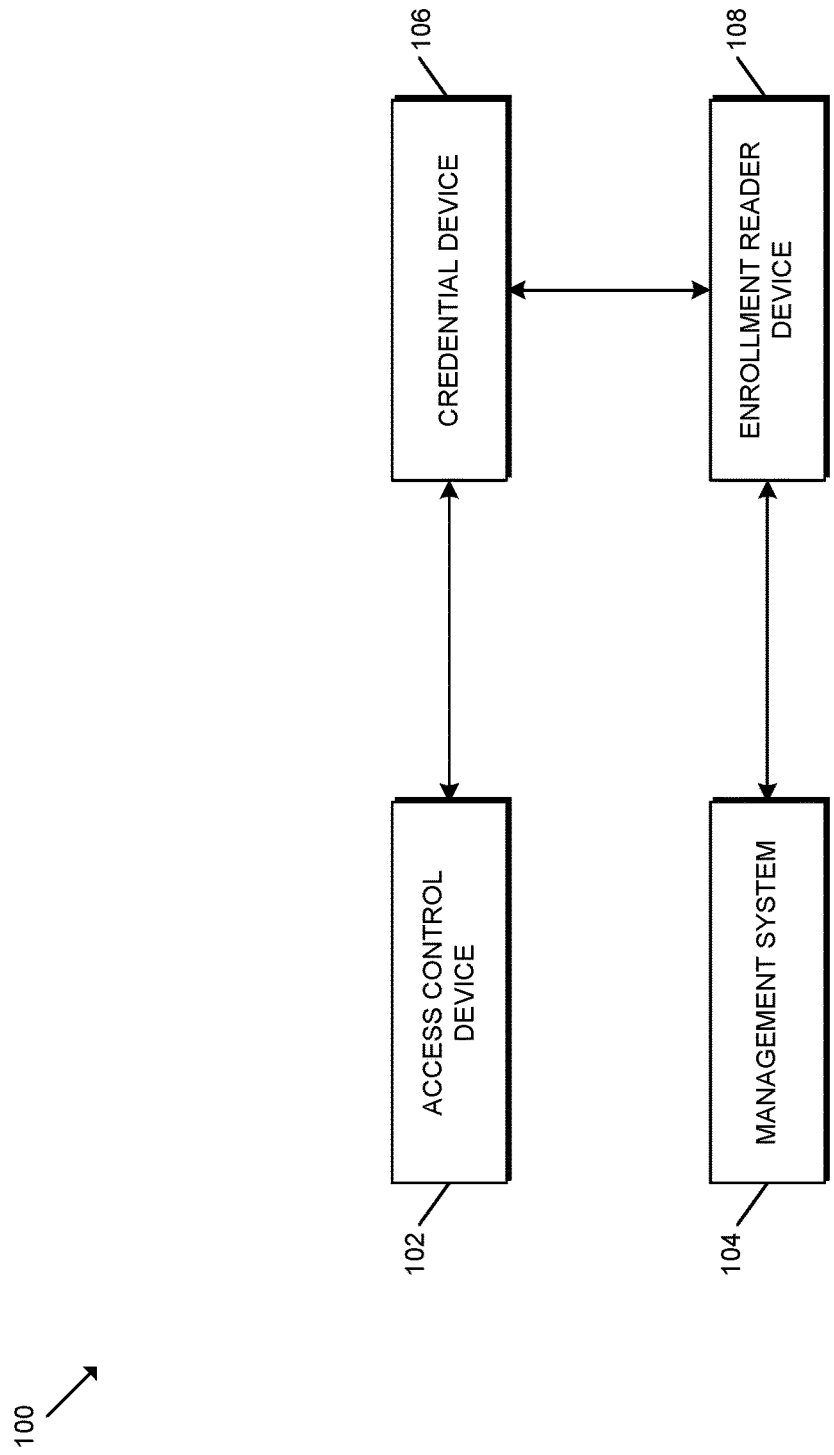
FIG. 1 is a simplified block diagram of at least one embodiment of an access control system for commissioning an access control device using a credential device.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for commissioning devices includes an access control device 102, a management system 104, a credential device 106, and an enrollment reader 108. As described in detail below, the access control system 100 allows commissioning of an access control device 102 from a credential device 106 (e.g., rather than merely from a mobile device), which allows for the access control device 102 to be commissioned, for example, without removing the access control device 102 from the door. In particular, in some embodiments, the credential device 106 may be programmed at a remote location with Internet access that is convenient for the integrator, and after programming, the credential device 106 may be transported to the installation site for commissioning of the access control device 102. It should be appreciated that such techniques may allow for the commissioning of access control devices 102 on site in a matter of seconds per device rather than the several minutes per device often expended due to removal of the devices and/or other factors using traditional techniques.

It should be appreciated that the access control device 102, the management system 104, the credential device 106, and/or the enrollment reader device 108 may be embodied as any type of device or collection of devices suitable for performing the functions described herein. More specifically, in the illustrative embodiment, the access control device 102 may be embodied as any type of device capable of controlling access through a passageway and/or otherwise performing the functions described herein. For example, in various embodiments, the access control device 102 may be embodied as or include an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), or a peripheral controller of a passageway. It should be further appreciated that the access control device 102 may include a lock mechanism configured to control access through the passageway and/or other components typical of a lock device. For example, the lock mechanism may include a deadbolt, latch bolt, lever, and/or other mechanism adapted to move between a locked state and an unlocked state. Depending on the particular embodiment, the access control device 102 may include a credential reader or be electrically/communicatively coupled to a credential reader configured to communicate with credential devices 106.

In the illustrative embodiment, one or more credential devices 106 may be embodied as a passive credential device having a credential identifier (e.g., a unique ID) stored therein and is "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential device 106. In particular, in some embodiments, one or more of the passive credential devices may be embodied as a smartcard, which is configured to communicate over a high frequency carrier frequency of nominally 13.56 MHz. More specifically, in some embodiments, the credential device 106 may be embodied as or include a MIFARE EV1 credential or a MIFARE EV2 credential. However, it should be appreciated that, in other embodiments, one or more of the credential devices 106 may be embodied as another type of credential device capable of performing the functions described herein. In some embodiments, it should be appreciated that smartcard emulation may be used, such that the credential device 106 described herein may be emulated by a mobile device (e.g., following one or more of the same file structure(s) described herein). In such embodiments, the mobile device may include features similar to the computing device 200 described below in reference to FIG. 2.

It should be appreciated that each of the enrollment reader device 108 and the access control device 102 may be configured to write various data to the credential device 106 and read various data therefrom as described in greater detail below. Further, depending on the particular embodiment, the enrollment reader device 108 may be configured to communicate with the management system 104 via any suitable technologies and/or protocols. For example, in some embodiments, the enrollment reader device 108 may communicate with the management system 104 using an intermediate computing device (e.g., via a wired and/or wireless communication connection between the enrollment reader device 108 and the intermediate computing device). In other embodiments, the enrollment reader device 108 may be configured to communicate via Wi-Fi, for example, in which case the enrollment reader device 108 may communicate with the management system 104 more directly (e.g., bypassing such an intermediate computing device).

As described herein, the management system 104 may be configured to manage the commissioning of various access control devices 102, manage credentials of the access control system 100, and/or otherwise perform the functions described herein. For example, the management system 104 may be responsible for ensuring that the access control devices 102 have updated authorized credentials, whitelists, blacklists, device parameters, and/or other suitable data. Additionally, in some embodiments, the management system 104 may receive security data, audit data, raw sensor data, and/or other suitable data from one or more of the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, the management system 104 may include a management server, a gateway device, an access control panel, a mobile device, and/or a local enrollment computing device depending on the particular embodiment. The functions of the management system 104 described herein may be performed by one or more of those devices in various embodiments. For example, in some embodiments, a management server may perform all of the functions of the management system 104 described herein.

It should be appreciated that each of the access control device 102, the management system 104, and/or the enrollment reader device 108 may be embodied as one or more computing devices similar to the computing device 200 described below in reference to FIG. 2. For example, in the illustrative embodiment, each of the access control device 102, the management system 104, and the enrollment reader device 108 includes a processing device 202 and a memory 206 having stored thereon operating logic 208 for execution by the processing device 202 for operation of the corresponding device.

It should be further appreciated that, although the management system 104 is described herein as one or more computing devices outside of a cloud computing environment, in other embodiments, the management system 104 may be embodied as a cloud-based device or collection of devices. Further, in cloud-based embodiments, the management system 104 may be embodied as a "serverless" or server-ambiguous computing solution, for example, that executes a plurality of instructions on-demand, contains logic to execute instructions only when prompted by a particular activity/trigger, and does not consume computing resources when not in use. That is, the management system 104 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the management system 104 described herein. For example, when an event occurs (e.g., data is transferred to the management system 104 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the management system 104), the appropriate virtual function(s) may be executed to perform the actions before eliminating the instance of the virtual function(s).

Although only one access control device 102, one management system 104, one credential device 106, and one enrollment reader device 108 are shown in the illustrative embodiment of FIG. 1, the system 100 may include multiple access control devices 102, management systems 104, credential devices 106, and/or enrollment reader devices 108 in other embodiments. For example, each user may be associated with one or more separate credential devices 106 in some embodiments.

Figure 2:
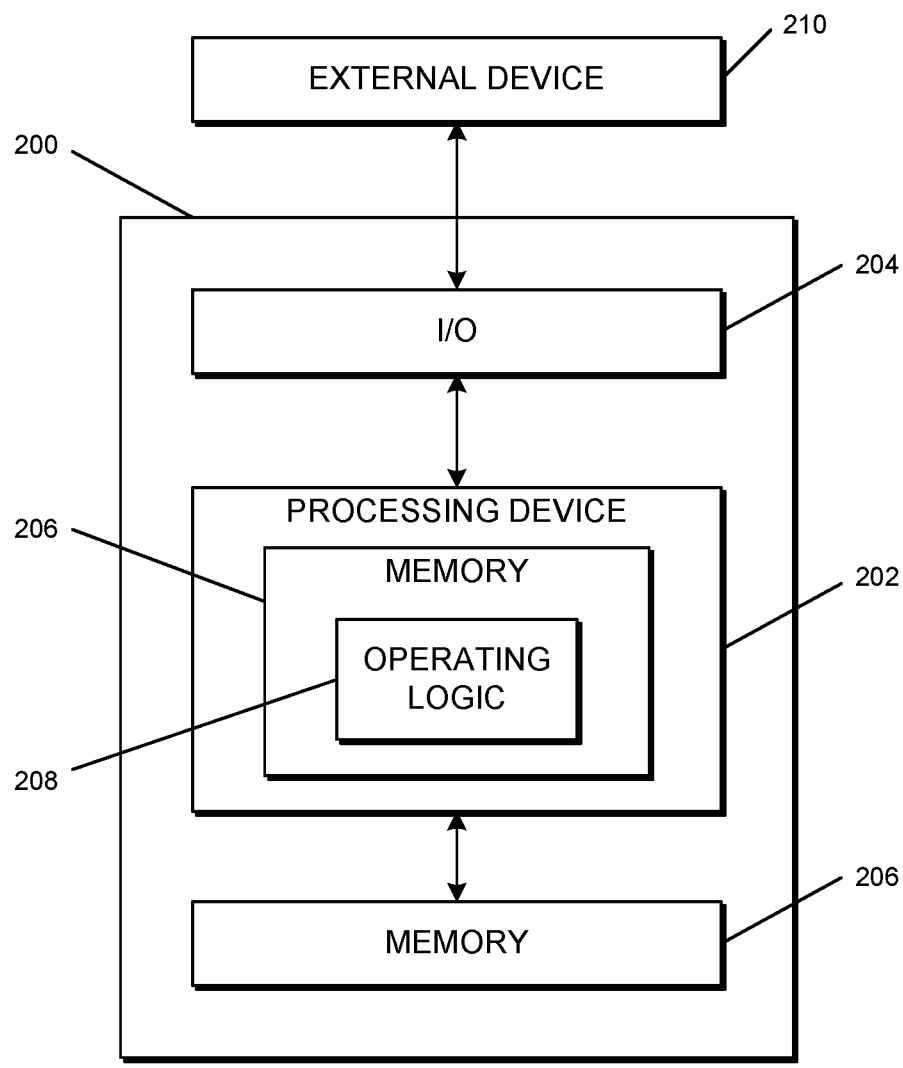
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device, management system, and/or enrollment reader device that may be utilized in connection with the access control device 102, the management system 104, and/or the enrollment reader device 108 illustrated in FIG. 1. Depending on the particular embodiment, the computing device 200 may be embodied as a reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the credential device 106, and/or the enrollment reader device 108. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices.

Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
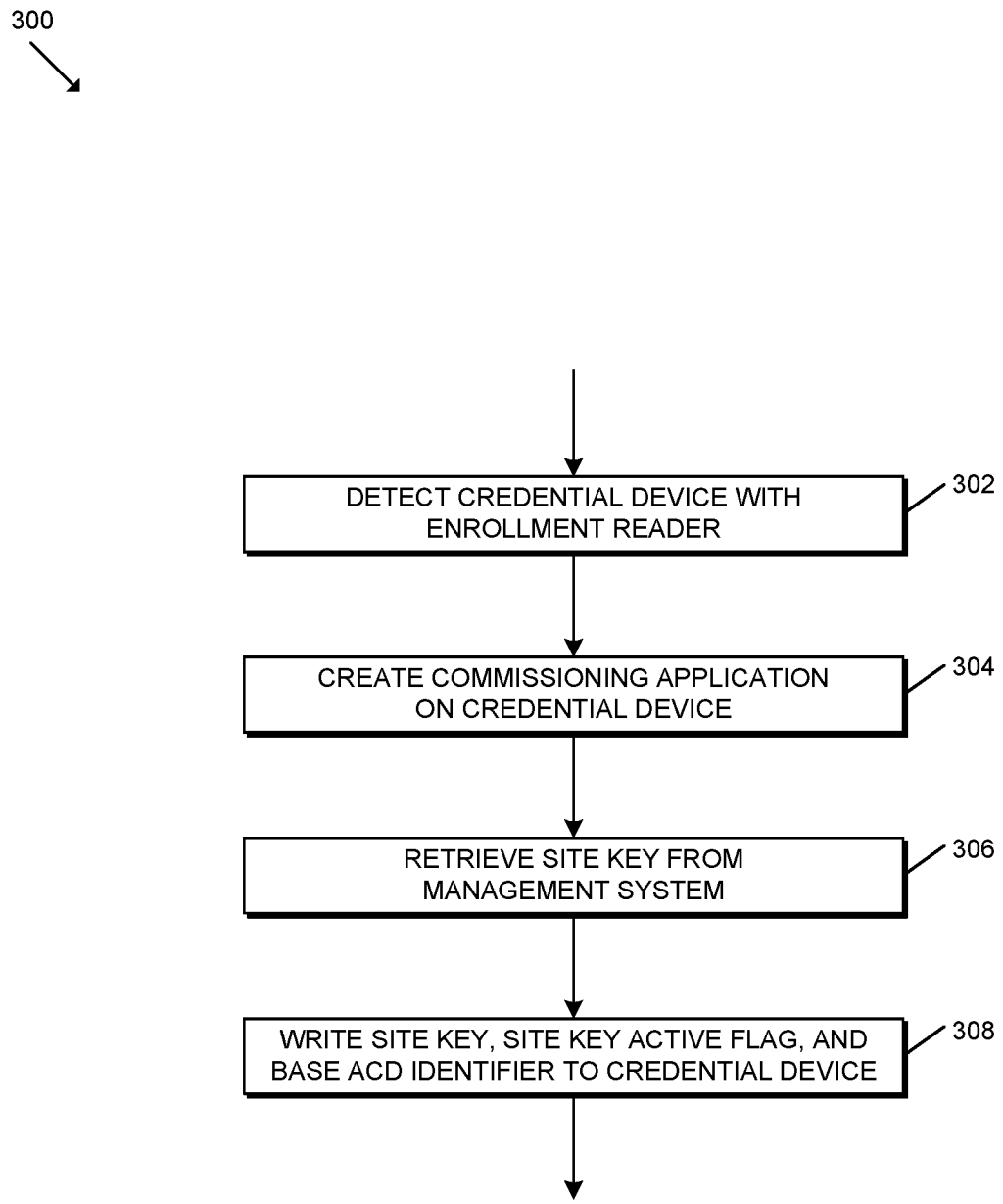
FIG. 3 is a simplified flow diagram of at least one embodiment of a method for configuring a commissioning application on the credential device of FIG. 1.

Referring now to FIG. 3, in use, the system 100 may execute a method 300 for configuring a commissioning application on the credential device 106. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which a credential device 106 is detected by the enrollment reader device 108. In some embodiments, it should be appreciated that an installer/administrator may leverage a commissioning application via a web-based portal of the management system 104 (e.g., accessible by a mobile device or local computer) or otherwise to start a commissioning event. In some embodiments, the commissioning application of the management system 104 may allow the installer/administrator to identify the number of access control devices 102 to commission in a particular batch. Accordingly, when the credential device 106 is detected by the enrollment reader device 108, the enrollment reader device 108 may create a commissioning application (or find an already created commissioning application) on the credential device 106 in block 304. It should be appreciated that, in some embodiments, the commissioning application may include a data format similar to that described in reference to FIG. 6.

In block 306, the enrollment reader device 108 retrieves a site key from the management system 104 (e.g., an ORCA system). It should be appreciated that the site key may correspond with a site at which the access control device 102 is to be commissioned. For example, a site may defined by a particular building or campus in some embodiments. In the illustrative embodiment, the site key is received by the enrollment reader device 108 from the management system 104 in a cryptographically encrypted. Depending on the particular embodiment, the site key may be encrypted using an asymmetric cryptographic algorithm or a symmetric cryptographic algorithm.

In block 308, the enrollment reader device 108 writes the site key (e.g., the encrypted site key), a site key active flag, and a base access control device identifier (e.g., lock identifier) to the credential device 106. For example, in some embodiments, the site key, flag, and identifier may be written to a commissioning application stored on the credential device 106. It should be appreciated that, in some embodiments, the site key active flag may be used to determine whether a site key has been stored to the credential device 106. Further, in some embodiments, the access control device identifier may be modified (e.g., incremented) as additional data for commissioning access control devices 102 is added to the credential device 106 as described below.

Although the blocks 302-308 are described in a relatively serial manner, it should be appreciated that various blocks of the method 300 may be performed in parallel in some embodiments.

Figure 4:
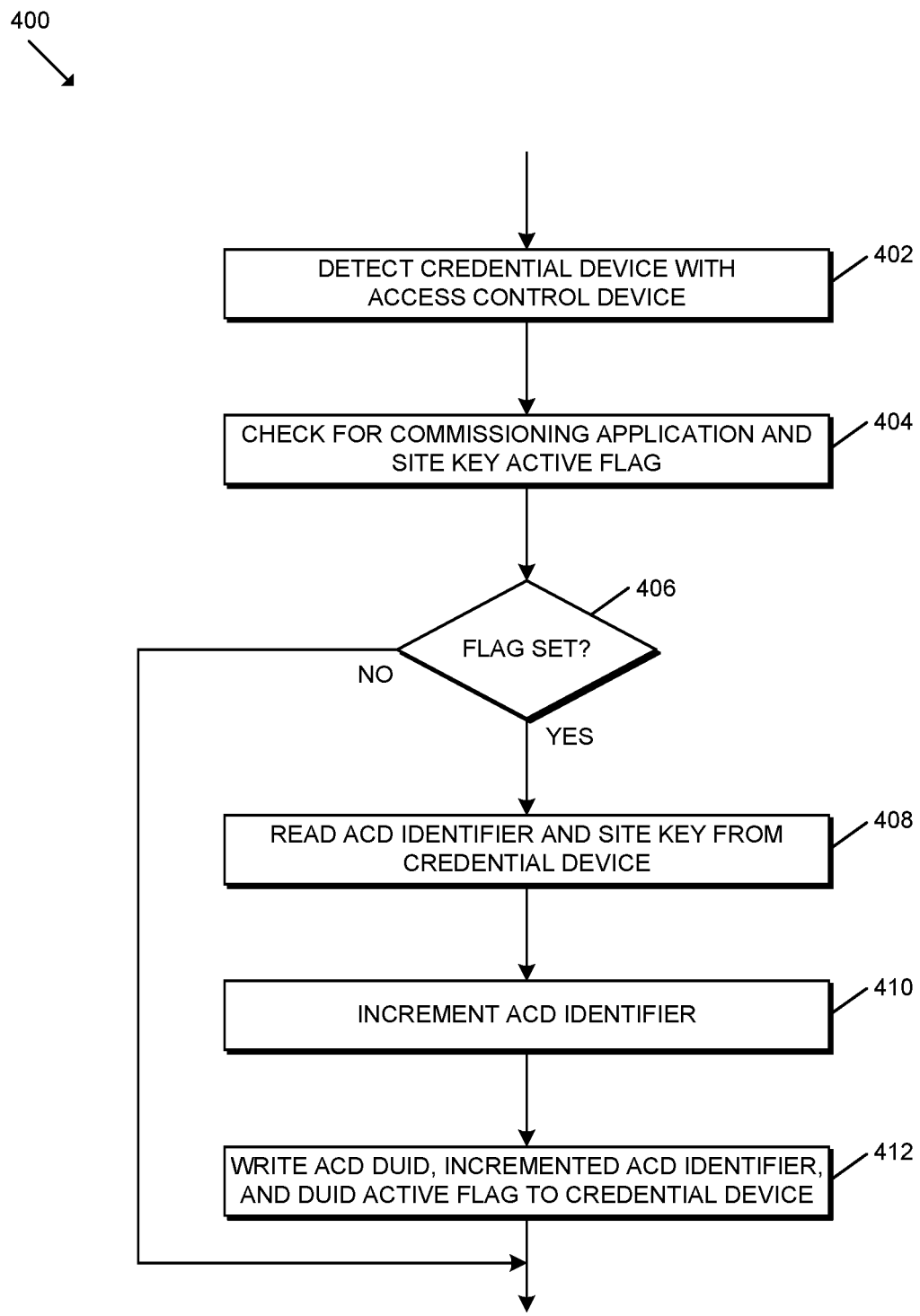
FIG. 4 is a simplified flow diagram of at least one embodiment of a method for commissioning an access control device using the credential device of FIG. 1.

Referring now to FIG. 4, in use, the system 100 may execute a method 400 for commissioning an access control device 102 using the credential device 106. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the credential device 106 is detected by the access control device 102. In block 404, the access control device 102 reads the data stored on the credential device 106 to determine whether the site key active flag is set (e.g., within a commissioning application). In some embodiments, the access control device 102 may also confirm that the credential device 106 is a particular type of credential device (e.g., a MIFARE EV1 credential).

If the access control device 102 determines, in block 406, that the site key active flag is set, the method 400 advances to block 408. Otherwise, in some embodiments, the method 400 may terminate. In block 408, the access control device 102 reads the access control device identifier (e.g., lock identifier) and the site key (e.g., the encrypted site key) from the credential device 106. In other embodiments, it should be appreciated that the access control device 102 may read additional and/or alternative information from the credential device 106. For example, the access control device 102 may read any data (e.g., metadata) needed to commission the device, such as group identifiers (e.g., for logical groupings of devices), the person/entity that commissioned the device, device name, a certificate (e.g., for SLL), and/or other relevant data for device commissioning.

In block 410, the access control device 102 increments the access control device identifier (e.g., by one) to generate a modified access control device identifier. In other embodiments, it should be appreciated that the access control device 102 may otherwise modify the access control device identifier. For example, in some embodiments, the access control device identifier may be incremented by any suitable value. Further, in other embodiments, the access control device identifier may be decremented, shifted, or otherwise modified in a manner suitable for the particular embodiment.

In block 412, the access control device 102 writes back the incremented (or otherwise modified) access control device identifier to the credential device 106. Further, in the illustrative embodiment, the access control device 102 also writes an access control device unique identifier (DUID) associated with the access control device 102 (e.g., assigned to and/or generated by the access control device 102) and a corresponding DUID active flag to the credential device 106 (e.g., see FIG. 6).

Although the blocks 402-412 are described in a relatively serial manner, it should be appreciated that various blocks of the method 400 may be performed in parallel in some embodiments. It should be further appreciated that, in some embodiments, each of the access control devices 102 to be commissioned using the credential device 106 may execute the method 400 in a manner similar to that described above. It should be even further appreciated that the method 400 of FIG. 4 may be executed subsequent to the method 300 of FIG. 3.

Figure 5:
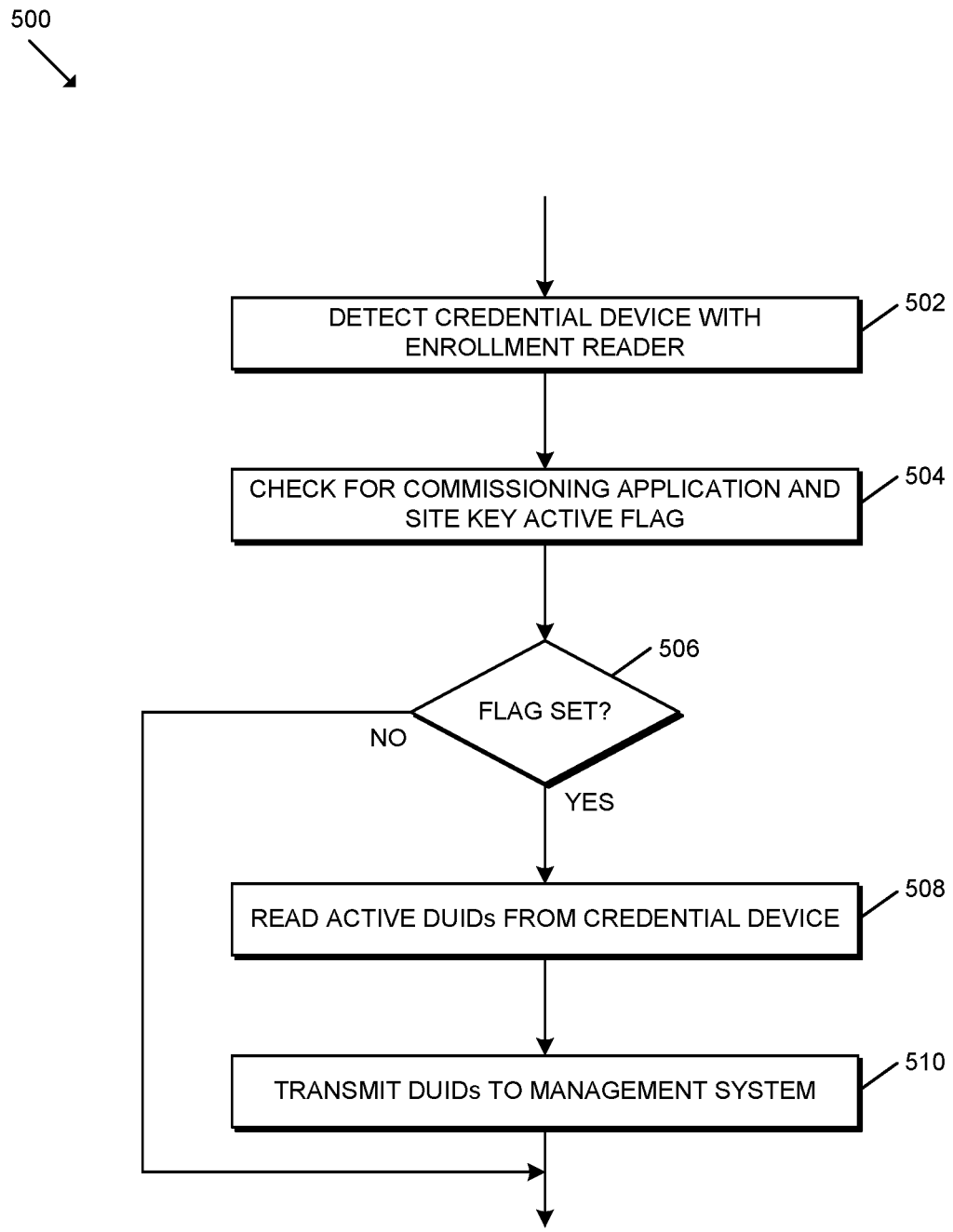
FIG. 5 is a simplified flow diagram of at least one embodiment of a method for transmitting commissioning data to the management system of FIG. 1.

Referring now to FIG. 5, in use, the system 100 may execute a method 500 for transmitting commissioning data to the management system 104. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the credential device 106 is detected by the enrollment reader device 108. In block 504, the enrollment reader device 108 reads the data stored on the credential device 106 to determine whether the site key active flag is set (e.g., within a commissioning application). In some embodiments, the enrollment reader device 108 may also confirm that the credential device 106 is a particular type of credential device (e.g., a MIFARE EV1 credential).

If the enrollment reader device 108 determines, in block 506, that the site key active flag is set, the method 500 advances to block 508. Otherwise, in some embodiments, the method 500 may terminate. In block 508, the enrollment reader device 108 reads the active DUIDs stored on the credential device 106. As such, it should be appreciated that the active DUIDs may include a DUID stored to the credential device 106 associated with a particular access control device 102 by virtue of executing the method 400 of FIG. 4 described above. In block 510, the enrollment reader device 108 transmits the DUIDs to the management system 104 (e.g., as a feedback mechanism to the management system 104, thereby confirming the commissioning of the corresponding access control devices 102).

Although the blocks 502-510 are described in a relatively serial manner, it should be appreciated that various blocks of the method 500 may be performed in parallel in some embodiments. It should be further appreciated that the method 500 of FIG. 5 may be executed subsequent to the method 400 of FIG. 4.

Figure 6:
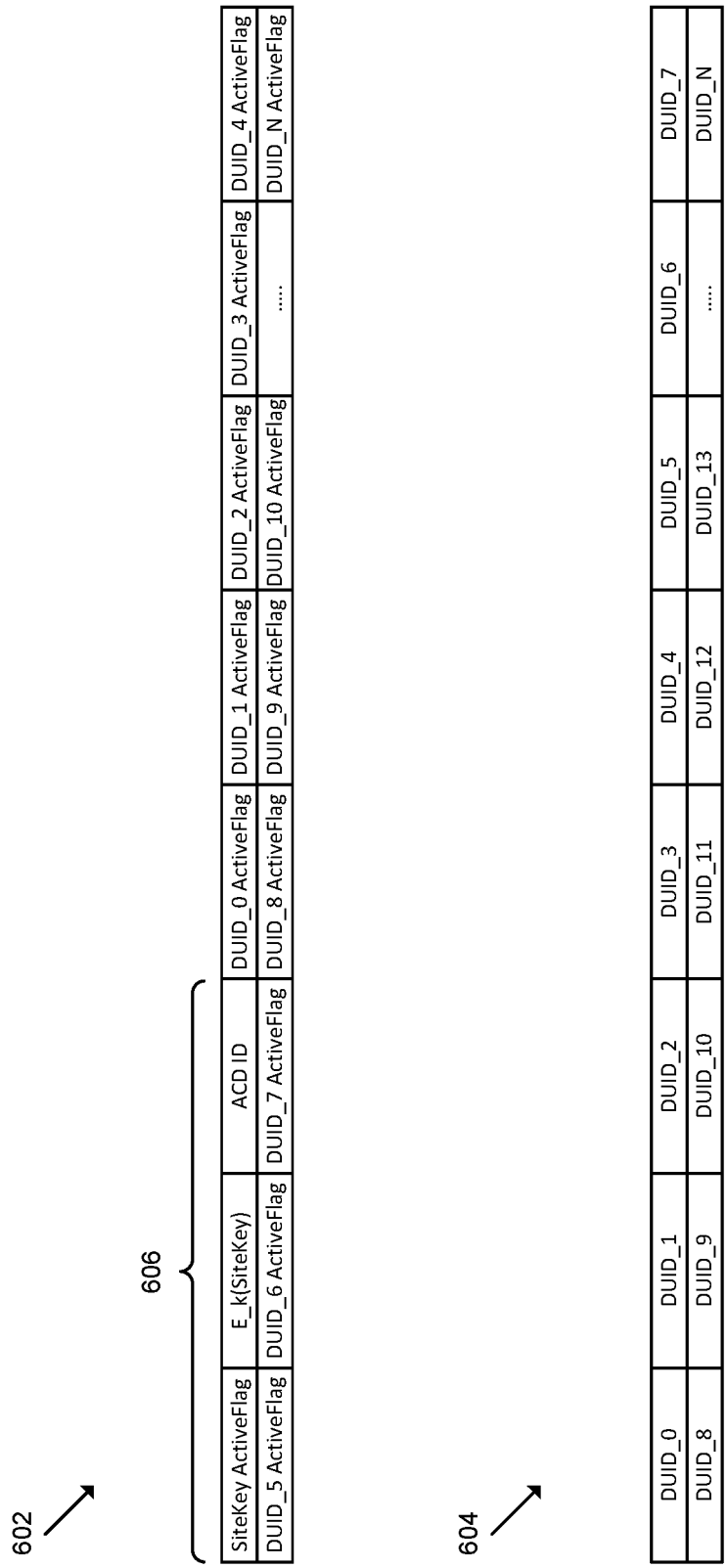
FIG. 6 illustrates at least one embodiment of a format for commissioning data of a credential device.

Referring now to FIG. 6, at least one embodiment of a format for commissioning data of the credential device 106 is shown (e.g., as part of a commissioning application on the credential device 106). As shown, the illustrative commissioning data includes a header 602 and a management system payload 604.

Further, in the illustrative embodiment, the header 602 includes a commission payload 606 that includes the site key active flag, the encrypted site key, and the access control device identifier (e.g., the lock identifier). The illustrative header 602 also includes active flags associated with each of the DUIDs stored to the credential device 106 (e.g., DUID_0 ActiveFlag, DUID_1 ActiveFlag . . . , DUID_N ActiveFlag). As shown, the illustrative management system payload 604 includes each of the DUIDs stored to the credential device 106 and corresponding with the active flags referenced in the header 602 (e.g., DUID_0, DUID_1, . . . , DUID_N).

In the illustrative embodiment, the site key active flag and each of the DUID active flags of the header is 1 byte in size, the encrypted site key is 32 bytes in size, the access control device identifier is 2 bytes in size, and each of the DUIDs of the management system payload 604 is 16 bytes in size. Of course, it should be appreciated that the corresponding size of each of those fields may vary depending on the particular embodiment. Further, in some embodiments, the credential device 106 and/or the commissioning application data itself may include additional and/or alternative fields/data.

What is claimed is:

1. A method for commissioning an access control device, the method comprising:
writing, by an enrollment reader, a site key and an access control device identifier to a credential device;
reading, by the access control device, the site key and the access control device identifier from the credential device;
modifying, by the access control device, the access control device identifier to generate a modified access control device identifier, wherein modifying the access control device identifier comprises at least one of incrementing the access control device identifier, decrementing the access control device identifier, or shifting the access control device identifier;
writing, by the access control device, a device unique identifier (DUID) associated with the access control device and the modified access control device identifier to the credential device; and
reading, by the enrollment reader, the DUID from the credential device.

2. The method of claim 1, further comprising transmitting, by the enrollment reader, the DUID to a management system.

3. A method for commissioning an access control device, the method comprising:
writing, by an enrollment reader, a site key and an access control device identifier to a credential device;
reading, by the access control device, the site key and the access control device identifier from the credential device;
writing, by the access control device, a device unique identifier (DUID) associated with the access control device and a modified access control device identifier to the credential device; and
reading, by the enrollment reader, the DUID from the credential device;
wherein reading the DUD from the credential device comprises reading a plurality of DUIDs from the credential device associated with corresponding access control devices; and
wherein the plurality of DUIDs includes the DUD associated with the access control device.

4. The method of claim 1, wherein writing the site key to the credential device comprises writing an encrypted site key to the credential device.

5. A method for commissioning an access control device, the method comprising:
writing, by an enrollment reader, a site key and an access control device identifier to a credential device;
reading, by the access control device, the site key and the access control device identifier from the credential device;
writing, by the access control device, a device unique identifier (DUD) associated with the access control device and a modified access control device identifier to the credential device; and
reading, by the enrollment reader, the DUD from the credential device;
wherein writing the site key and the access control device identifier to the credential device further comprises writing a site key active flag to the credential device.

6. The method of claim 5, wherein reading the site key and the access control device identifier from the credential device comprises reading the site key and the access control device identifier from the credential device in response to determining that the site key active flag is set.

7. The method of claim 5, wherein reading the DUD from the credential device comprises reading the DUD from the credential device in response to determining that the site key active flag is set.

8. The method of claim 1, wherein the credential device comprises a smartcard.

9. The method of claim 1, wherein the credential device comprises one of a MIFARE EV1 credential or a MIFARE EV2 credential.

10. A system for device commissioning, the system comprising:
a credential reader configured to write a site key and a lock identifier to a smartcard; and
an electronic lock device configured to (i) read the site key and the lock identifier from the smartcard, (ii) increment the lock identifier to generate a modified lock identifier, and (iii) write a device unique identifier (DUID) of the electronic lock device and the modified lock identifier to the smartcard; and wherein the credential reader is further configured to read the DUID from the smartcard.

11. The system of claim 10, further comprising a management system configured to receive the DUID from the credential reader.

12. The system of claim 10, wherein to write the site key to the smartcard comprises to write an encrypted site key to the smartcard.

13. The system of claim 10, wherein to write the site key and the lock identifier to the smartcard further comprises to write a site key active flag to the smartcard.

14. The system of claim 13, wherein to read the site key and the lock identifier from the smartcard comprises to read the site key and the lock identifier from the smartcard in response to a determination that the site key active flag is set.

15. The system of claim 13, wherein to read the DUID from the smartcard comprises to read the DUID from the smartcard in response to a determination that the site key active flag is set.

16. The system of claim 10, wherein the smartcard comprises one of a MIFARE EV1 credential or a MIFARE EV2 credential.

17. An access control device for device commissioning, the access control device comprising:

at least one processor; and at least one memory comprising a plurality of instructions stored thereon that, in response to execution by the at least one processor, causes the access control device to:
read a site key and an access control device identifier from a credential device;
increment the access control device identifier to generate a modified access control device identifier; and
write a device unique identifier (DUID) of the access control device and the modified access control device identifier to the credential device.

18. The access control device of claim 17, wherein to read the site key and the access control device identifier from the credential device comprises to read the site key and the access control device identifier from the credential device in response to a determination that a site key active flag is set on the credential device.

19. The access control device of claim 17, wherein to read the site key and the access control device identifier from the credential device comprises to read the site key and the access control device identifier from one of a MIFARE EV1 credential or a MIFARE EV2 credential.

20. The method of claim 1, wherein the access control device comprises an electronic lock device.

\* \* \* \* \*